United States Patent
Dillon et al.

(10) Patent No.: US 6,802,366 B1
(45) Date of Patent: Oct. 12, 2004

(54) SWAGE METHOD FOR COOLING PIPES

(75) Inventors: Steve Dillon, Fort Collins, CO (US); Justin Mauck, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 208 days.

(21) Appl. No.: 10/284,821

(22) Filed: Oct. 31, 2002

(51) Int. Cl.$^7$ ................................................. F28F 1/00
(52) U.S. Cl. .................... 165/177; 29/890.044; 29/423; 285/382; 72/370.13
(58) Field of Search ................................ 165/177, 178, 165/183; 29/890.044, 890.043, 890.045, 505, 423; 72/370.04, 370.13, 367.1; 285/382.5, 382

(56) References Cited

U.S. PATENT DOCUMENTS

| | | | | |
|---|---|---|---|---|
| 2,202,125 A | * | 5/1940 | Temple | 72/415 |
| 2,972,186 A | * | 2/1961 | Howe | 29/516 |
| 3,221,532 A | * | 12/1965 | Bazata et al. | 72/312 |
| 3,731,518 A | * | 5/1973 | Blocher | 72/402 |
| 3,771,343 A | * | 11/1973 | Dawson | 72/402 |
| 3,792,603 A | * | 2/1974 | Orain | 72/402 |
| 3,823,597 A | * | 7/1974 | Hanback et al. | 72/402 |
| 3,848,451 A | * | 11/1974 | Allin | 72/402 |
| 4,785,656 A | * | 11/1988 | Kennedy | 72/402 |
| 6,412,160 B1 | * | 7/2002 | Glessner et al. | 29/423 |

* cited by examiner

*Primary Examiner*—Terrell McKinnon
(74) *Attorney, Agent, or Firm*—Blakely, Sokoloff, Taylor & Zafman LLP

(57) ABSTRACT

A method and apparatus are described for inserting a cooling tube into a metal component to remove heat generated at the surface by flowing fluid through the tube, thereby cooling the metal component. A cooling tube is placed into a groove of a metal component having first and second surfaces, where the width of the groove at the surfaces is approximately equal to the outer diameter of the cooling tube. The metal component also has two ridges: a first ridge on one end of the groove at the first surface of the metal component, and a second ridge on the other end of the groove at the second surface of the metal component. After the cooling tube is placed in the groove of the metal component, the cooling tube is swaged into the groove of the metal component by applying pressure to the first and second ridges until the first ridge, second ridge, and cooling tube are flush with the top surface.

30 Claims, 13 Drawing Sheets

| | Description | Thermal Resistance per cm of Tube 1100W Total Power Based on Position #1 Data (cm*C/W) | Differential Pressure Drop @ 1.5 GPM Round Tube = 2.2 PSI (PSI) | Thermal Resistance per cm of Tube *AFTER* 10 Thermal Cycles 1 cycle = <30c to >100c 1100W Total Power Based on Position #1 Data (cm*C/W) |
|---|---|---|---|---|
| 1 | Ridge Method .335" Deep, No joint subsance | 1.1088 | 4.1 | |
| 2 | Ridge Method .355" Deep, No joint substance | 1.5817 | 3.3 | |
| 3 | Ridge Method .375" Deep, No joint substance | 1.8079 | 2.9 | |
| 4 | Ridge Method .375" Deep, Epoxy #1 in joint | 1.0893 | 2.9 | 1.5828 |
| 5 | Ridge Method .375" Deep, Thermal grease joint | 0.7186 | 2.9 | |
| 6 | Ridge Method .335" Deep, Epoxy #1 in joint | 0.9093 | 4.1 | 1.3878 |
| 7 | Ridge Method .335" Deep, Thermal grease joint | 0.4363 | 4.1 | |
| 8 | Ridge Method .335" Deep, Adhesive #1 in joint | 0.4060 | 4.1 | 0.3742 |
| 9 | Ridge Method .375" Deep, Adhesive #1 in joint | 0.5757 | 2.9 | 0.5459 |
| 10 | 1/2 Ridge Method #1, Adhesive #1 in joint | 0.2440 | 4.6 | |
| 11 | 1/2 Ridge Method #2, Adhesive #1 in joint | 0.4142 | 2.6 | |

SWAGE METHOD FOR COOLING PIPES

COPYRIGHT NOTICE

A portion of the disclosure of this patent document may contain material which is subject to copyright protection. To the extent that it does, the copyright owner has no objection to the facsimile reproduction by anyone of the patent document or the patent disclosure as it appears in the Patent and Trademark Office patent file or records, but otherwise reserves all copyright rights whatsoever. The following notice applies to any software and data that may be described below and in the drawings hereto: Copyright © 2002, Advanced Energy, Inc., All Rights Reserved.

FIELD OF THE INVENTION

Embodiments of this invention relate to the field of metal cooling techniques, and more specifically, to a method of installing cooling tubes into a metal component to remove heat from the metal component.

BACKGROUND OF THE INVENTION

Metal components are used in various industrial applications. In volatile applications, such as plasma chamber cleaning where the chamber is composed of a metal component, the metal component is subjected to highly reactive gases colliding against it, resulting in the metal component becoming very hot. In order to keep the chamber cool, heat must be removed from the metal component.

One method of cooling the metal is to directly apply water to the metal component. However, water causes the performance of the metals to change. For instance, water directly applied to aluminum can cause the aluminum to degrade by galvanic corrosion.

Another method of cooling the metal is to insert a non-corrosive cooling tube into the metal, and run water through the cooling tube, allowing the heat from the metal to transfer to the cooling tube. For example, where aluminum is used as the metal component, copper is commonly used for the cooling tube since it is a more noble metal and is less likely to degrade by galvanic corrosion. Also, copper has a high thermal conductivity compared to other tube metals resulting in less thermal resistance from the metal component to the water.

One way of inserting the cooling tube into the metal is to use a metal component that has an undercut joint. In this method, a filler material is put into the joint of the metal component to remove air pockets in and around a colling tube that is placed therein. Once the filler material is put into the joint, the cooling tube is pressed in, fitting the contour of the undercut joint.

SUMMARY OF THE INVENTION

In one aspect of the invention is a method for placing a cooling tube in a metal component into cool the metal component. The method comprises inserting the cooling tube into a groove of the metal component that has a first surface and a second surface, and that has at least one ridge that extends in a positive, vertical direction from a corresponding surface. The groove has an inner surface, and extends from the first and second surfaces into the metal component, and the cooling tube has an outer surface, and an outer diameter that is approximately equal to the width of the groove at the surfaces. Furthermore, the outer surface of the cooling tube is adjacent to the inner surface of the groove. The cooling tube is then swaged into the groove of the metal component by applying pressure to the at least one ridge until the at least one ridge and cooling tube are flush with the first and second surfaces.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 13 is a table summarizing the result of tests using various ridge heights and filler materials.

DETAILED DESCRIPTION OF THE INVENTION

In one aspect of the invention is a method for installing a cooling tube into a metal component for cooling the metal component. A cooling tube is placed into a groove of a metal component, where the width of the upper end of the groove is approximately equal to the outer diameter of the cooling tube. The metal component also has at least one ridge. In illustrated embodiments, the metal component comprises two ridges: a first ridge on one end of the groove at a first surface of the metal component, and a second ridge on the other end of the groove . . . at a second surface of the metal component. After the cooling tube is placed in the groove of the metal component, the cooling tube is swaged into the groove of the metal component by applying pressure to the first and second ridges until the first ridge, second ridge, and cooling tube are flush with the surfaces.

Introduction

Figure 1:
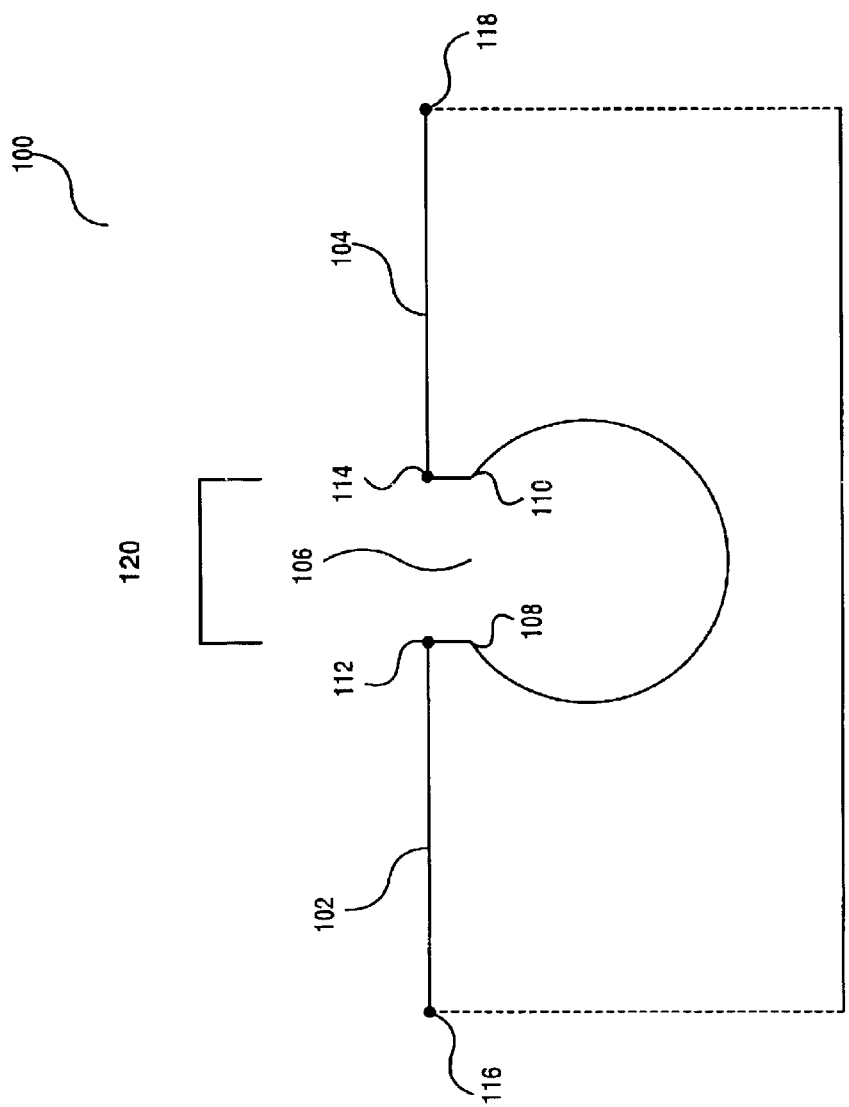
FIG. 1 illustrates a prior art metal component of a metal cooling system.

FIG. 1 illustrates a prior art metal component 100 used for placing a cooling tube within for cooling the metal component. The metal component 100 comprises two surfaces 102, 104, and a groove 106. The metal component comprises a first surface 102 having a first point 116 that indicates the outer end of the first surface (first outer point) and a second inner point 112 that indicates the inner end of the first surface (second inner point), and a second surface 104 having a fourth point 118 that indicates an outer end of the second surface (fourth outer point), and a third point 114 that indicates an inner end of the second surface (third inner point).

A groove 106 lies between the two surfaces 102, 104. The groove begins at the second inner point 112, curves into the metal component 100 to form undercut joints 108, 110, and ends at the third point 114. The curved extensions described above form undercut joints 108, 110 that are derived from the first and second surfaces 102, 104, respectively.

Under the illustrated prior art, the width 120 of the groove 106 at the surfaces 102, 104 is slightly smaller than the diameter of a cooling tube to be placed therein. To get the cooling tube into the groove 106, it is forceably pressed in, such that the cooling tube sits below the undercut joints 108, 110, and fits the contour of the undercut joints 108, 110. Prior to placing the cooling tube into the groove 106, a filler material may be put into the groove 106. The filler material surrounds the cooling tube up to the surfaces 102, 104.

In embodiments of the invention, a cooling tube is swaged into a metal component and a tight joint is formed between the cooling tube and metal component in order to optimize heat transfer therebetween by pressing ridges of the metal component into the copper tube. Aspects of the invention are described in more detail below.

Method for Cooling Metal Component

Figure 2:
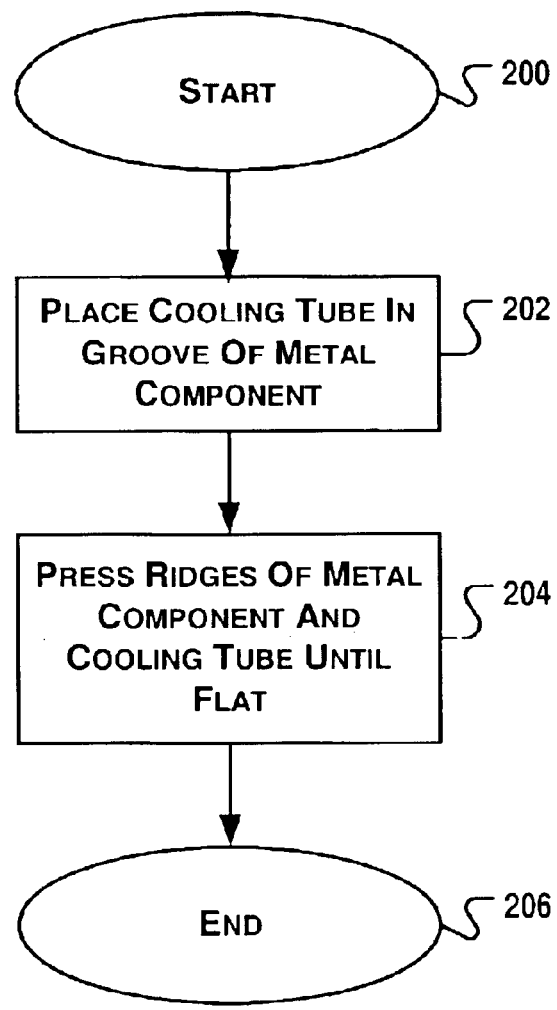
FIG. 2 is a flowchart illustrating a method for installing a cooling tube into a metal component within general embodiments of the invention.

FIG. 2 illustrates a method for placing a cooling tube into a metal component within general embodiments of the invention. The method begins at block 200 and continues to block 202 where a cooling tube is placed into a groove of a metal component, where the diameter of the cooling tube is approximately equal to the width of the groove towards the surfaces. At block 204, the two ridges that sit above the first and second surfaces on the metal component are pressed towards the first and second surfaces of the metal component and the cooling tube until the ridges are flush with the surfaces, and a single surface is formed. The method ends at block 206. The method may additionally comprise fly-cutting the single surface to smooth out the surface, as well as coating the inner surface of the groove with a filler material.

Metal Component

Figure 3:
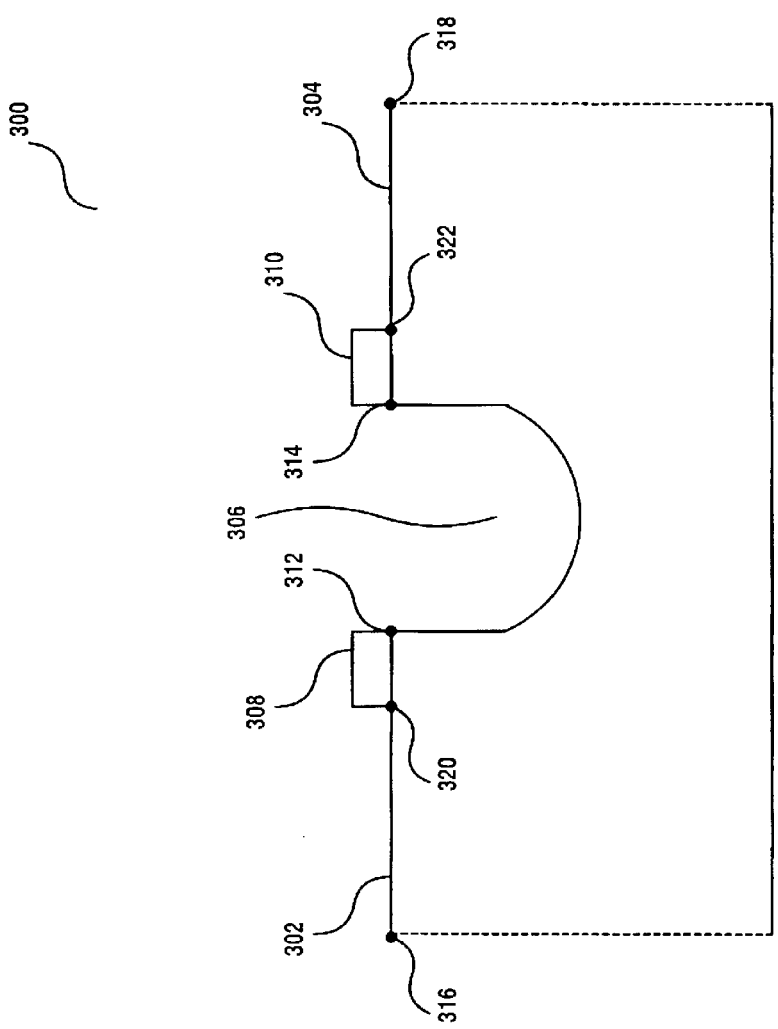
FIG. 3 illustrates a metal component used in a metal cooling system within general embodiments of the invention.

FIG. 3 illustrates a metal component 300 used for placing a cooling tube within for cooling the metal component. The metal component comprises two surfaces 302, 304, a groove 306, and at least one ridge 308, 310 (two illustrated), as described below.

Surfaces

The metal component comprises a first surface 302 having a first point 316 that indicates the outer end of the first surface (first outer point) and a second point 312 that indicates the inner end of the first surface (second inner point), and a second surface 304 having a fourth point 318 that indicates an outer end of the second surface (fourth outer point), and a third point 314 that indicates an inner end of the second surface (third inner point).

While the surfaces 302, 304 illustrated are planar to one another, and are positioned at 180 degree angles from each other, the invention should not be so limited. It is contemplated that there may be variations, and that such variations do not depart from the spirit and scope of the invention as described herein. For example, surfaces 302, 304 may be non-planar to each other, and/or the surfaces 302, 304 may be positioned at other than 180 degree angles from each other.

Groove

A groove 306 lies between the two surfaces 302, 304. The groove 306 begins at the second point 312, curves into the metal component 300 and towards the third point 314, and ends at the third point 314. While the groove has been described with respect to the points on the surfaces, it should be understood that a groove as discussed herein retains its normal definition as an indentation from a surface. Therefore, although the metal component is described as having two surfaces, the metal component may alternately be described as having a single surface having a groove located therein. However, because additional features are described, the description having two surfaces better illustrates embodiments of the invention.

Figure 4:
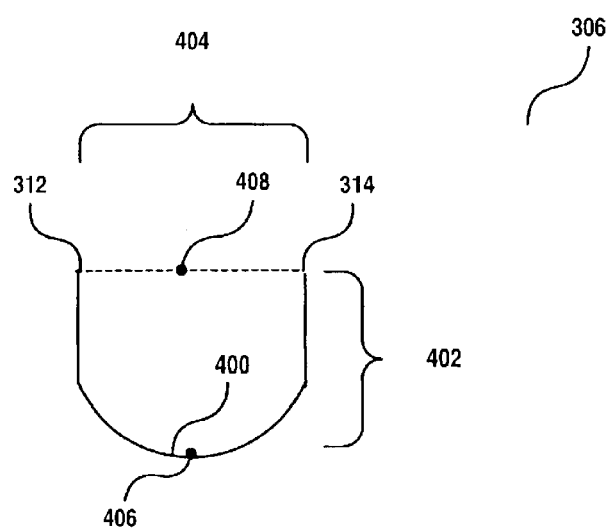
FIG. 4 illustrates a groove of the metal component.

As illustrated in FIG. 4, the groove 306 comprises an inner surface 400. In illustrated embodiments, the depth 402 of the groove is slightly smaller than the diameter of a cooling tube to be placed therein, so as to enable the deformation of metal from the ridges onto the cooling tube. In a symmetric groove, as illustrated in FIG. 4, the depth of the groove may be measured from the midpoint 406 of the groove bottom to an imaginary midpoint 408 between the second inner point 312 and the third inner point 314.

Although not illustrated, it is contemplated that the groove may be asymmetric, such that the second inner point 312 is higher or lower than the third inner point 314. In this case, the depth of the groove may be measured from either point 312, 314 to a point that extends from one of point 312, 314 to an imaginary point vertical therefrom.

The width 404 of the groove at the surfaces is approximately equal to the diameter of the cooling tube to be placed therein, so as to be able to place a cooling tube therein without force, and so as to leave as small a gap as possible between the inner surface 400 of the groove 306 and the cooling tube (see discussion below). For example, if the diameter of a cooling tube is 0.375", then the width of the groove at the surface is approximately 0.375"–0.380".

Alternatively, it is contemplated that the width of the groove at the surface 404 may be smaller than the diameter of a cooling tube to be placed within, such as that shown by prior art FIG. 1, but that the surfaces also comprise at least one ridge as illustrated in FIG. 3. In this embodiment, a cooling tube is pressed into a groove (to sit below an undercut joint, for instance), and is then swaged into place . . . by the at least one groove.

Although illustrated embodiments show a groove having a width at the surface approximately equal to the width of the groove at the bottom, it should be understood that such dimensions are approximate and for illustration purposes only, and are not intended to be limiting on the invention.

Ridges

Referring back to FIG. 3, metal component 300 comprises at least one ridge, although illustrated embodiments show two ridges. A first ridge 308 extends in a positive, vertical direction from a fifth point 320 and from around the second point 312 of the first surface 302, where the fifth point 320 lies anywhere between the first point 316 and the second point 312; and a second ridge 310 extends in a positive, vertical direction from around the third point 314 and from a sixth point 322 of the second surface 304, where the sixth point 322 lies anywhere between the third point 314 and the fourth point 318. As would be understood by one of ordinary skill in the art, a positive direction refers to a greater than zero coordinate on a y-axis, of a given x-y grid. However, as discussed below, the vertical direction need not be on the y-axis (i.e., the ridge does not have to be at a 90 degree angle from the surface).

Where the ridge extends from around the second point 312, or from around the third point 314, the ridge may extend from the second point or third point 312, 314 directly, or the ridge may extend from a point near the second point or third point 312, 314. As illustrated, the first ridge 308 extends from the fifth point 320, and from the second point 312, and the second ridge 310 extends from the third point 314 and from the sixth point 322. In this embodiment, the ridges 308, 310 extend from the groove 306.

In embodiments not illustrated, but contemplated, the first ridge may extend from the fifth point 320 and from a point near the second point 312, and the second ridge may extend from a point near the third point 314, and from the sixth point 322, such that the ridges 308, 310 do not extend directly from the groove 306. In this latter embodiment, the ridges 308, 310 are described as extending directly from their respective surfaces 302, 304. The point near the second 312 or third point 314 is sufficiently close to allow the ridge to deform around the cooling tube.

In embodiments shown, the ridges 308, 310 extend at 90 degree angles from their respective surfaces 302, 304, and the ridge tops are flat. However, the invention is not so limited, and the ridges may extend at non-perpendicular angles, and the ridge tops may be curved, or pointed, for example.

Figure 5:
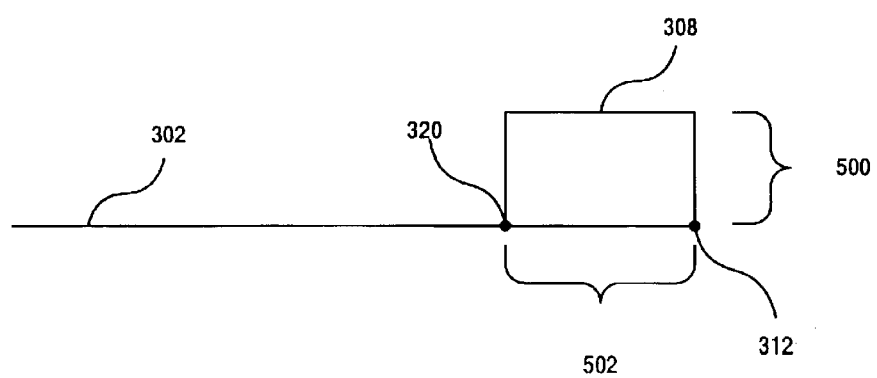
FIG. 5 illustrates a ridge of the metal component.

As illustrated in FIG. 5, the first and second ridges 308, 310 (only one 308 shown) each have a height 500 from their respective surfaces that is measured from the surfaces. The height (along with groove depth 402) determines the amount of crush of the cooling tube, which impacts the resulting cross section of the tube, which in turn impacts the pressure drop of fluid flowing through the tube—see discussion below. In an exemplary embodiment, the height of the ridges is approximately 8.5% of the outer diameter of the cooling tube. Thus, if the cooling tube has a diameter of 0.375", then the height of the ridges is approximately 0.032".

The ridges also have a thickness 502, measured from the fifth point 320 to a point on or near the second point 312 on the first surface, or from a point on or near the third point 314 to the sixth point 322, which determines the amount of pressure it takes to crush the joint, as well as the amount of aluminum moved over the tubing. The point on or near the second 312 or third point 314 is sufficiently close to allow the ridge to deform around the cooling tube. In embodiments of the invention where the cooling tube has a diameter of 0.375", the ridge thickness may be approximately 0.063", for example.

Although metal component 300 is shown as having two ridges, it is contemplated that embodiments of the invention may comprise a single ridge for manufacturing reasons. For example, where the cooling tube is near the edge of the metal component, and the surface of the metal component needs to be protected, there may be a desire to omit a ridge from that surface, such that a single ridge is formed from the other surface.

While the ridges are illustrated as extending above the surfaces as well as the cooling tube, there is no requirement that the ridges extend above the cooling tube, so long as the ridges extend above the surfaces.

Metal Cooling System

Figure 6:
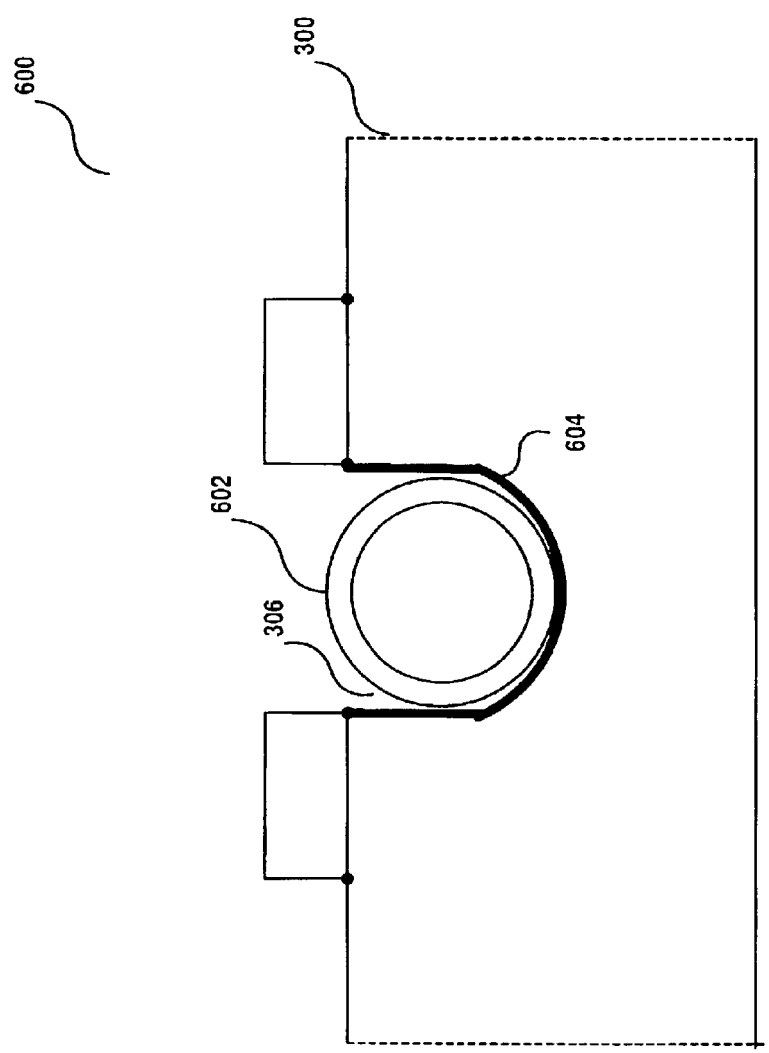
FIG. 6 illustrates a pre-processed metal cooling system comprising the metal component, and a cooling tube prior to swaging.

FIG. 6 illustrates a pre-processed metal cooling system 600 within general embodiments of the present invention. The pre-processed metal cooling system 600 comprises a metal component 300, and a cooling tube 602 placed in the groove 306 of the metal component 300.

Figure 7:
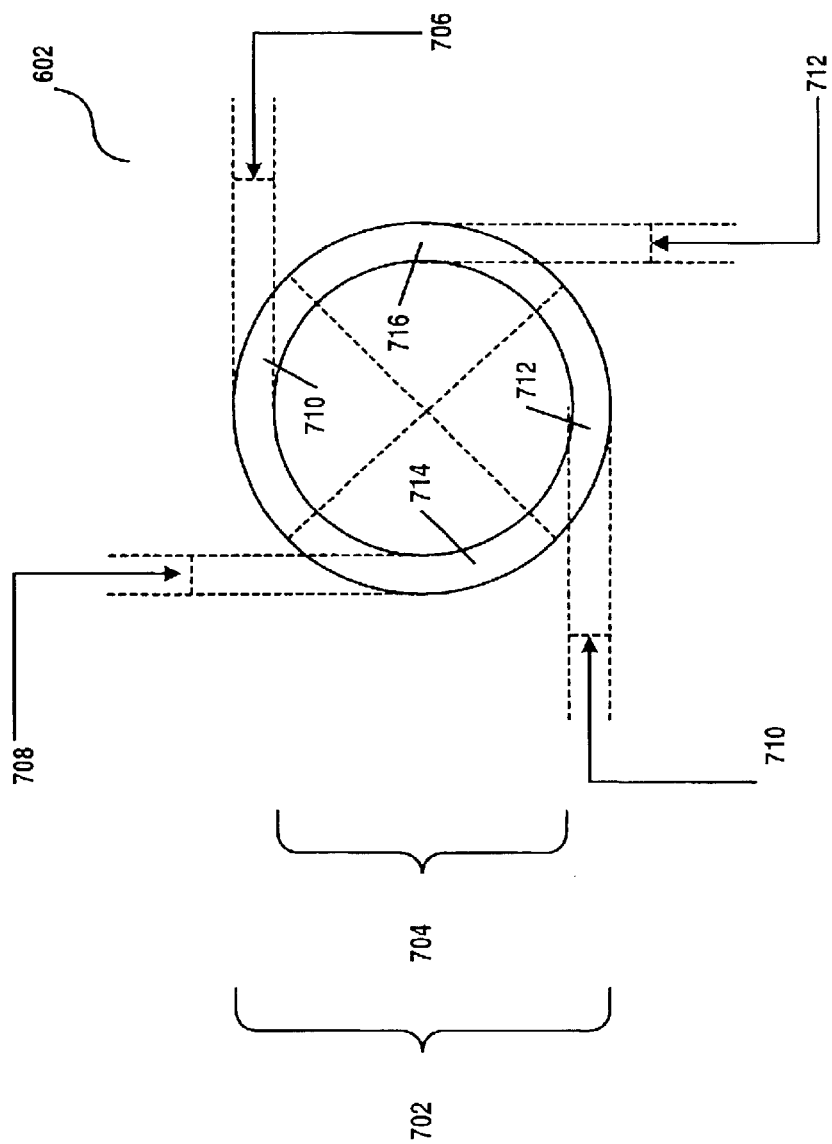
FIG. 7 illustrates a cooling tube prior to swaging.

As illustrated in FIG. 7, the cooling tube (pre-swaged) 602 has an outer diameter 702, an inner diameter 704, and a wall comprising an upper wall portion 710, a lower wall portion 712, and two side wall portions 714, 716. The thickness 706, 708, 710, 712 of the upper 710, lower 712, and side portions 714, 716, respectively, is equal to one another. The outer diameter 702 of the wall 706 is approximately equal to the width 404 of the groove 306 into which it is placed.

Figure 8:
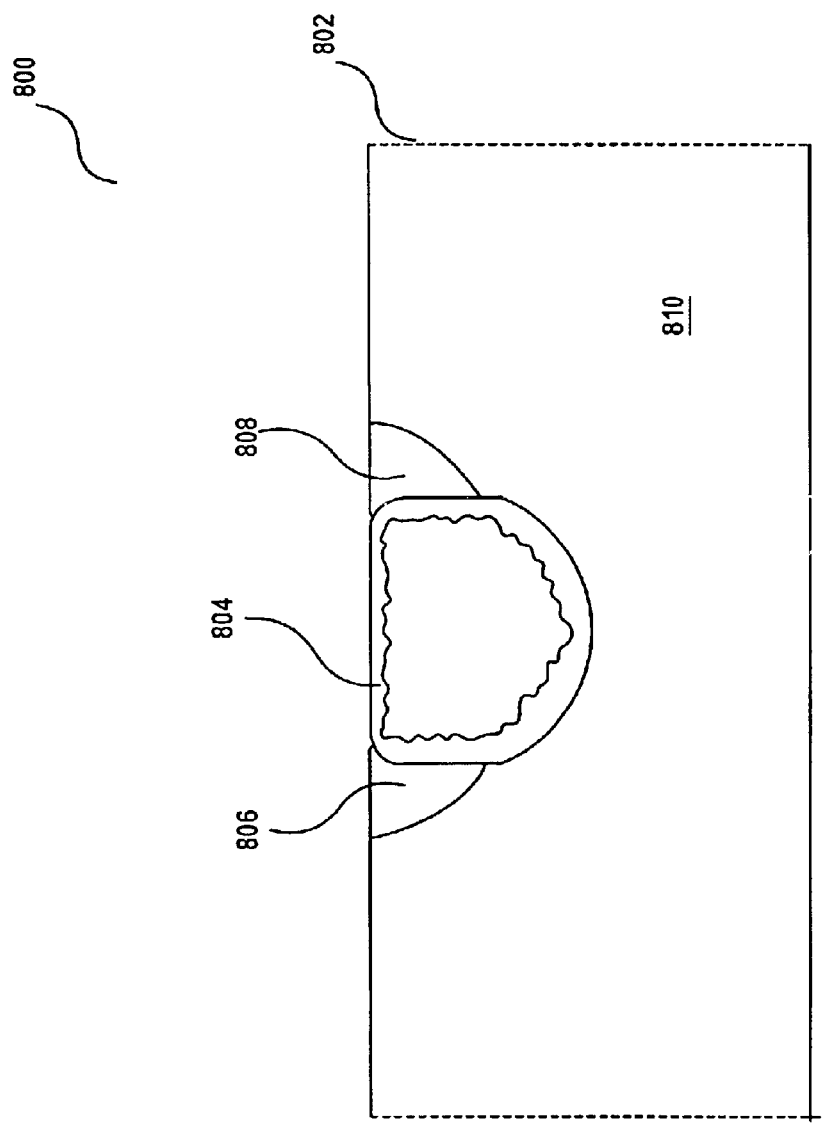
FIG. 8 illustrates a processed metal cooling system comprising a processed metal component, and a swaged cooling tube.

FIG. 8 is a side view 810 of a processed metal cooling system 800 in which the cooling tube has been swaged into place. The system 800 comprises a processed metal component 802, a swaged cooling tube 804, and deformed metal 806, 808.

Processed Metal Component

Figure 9:
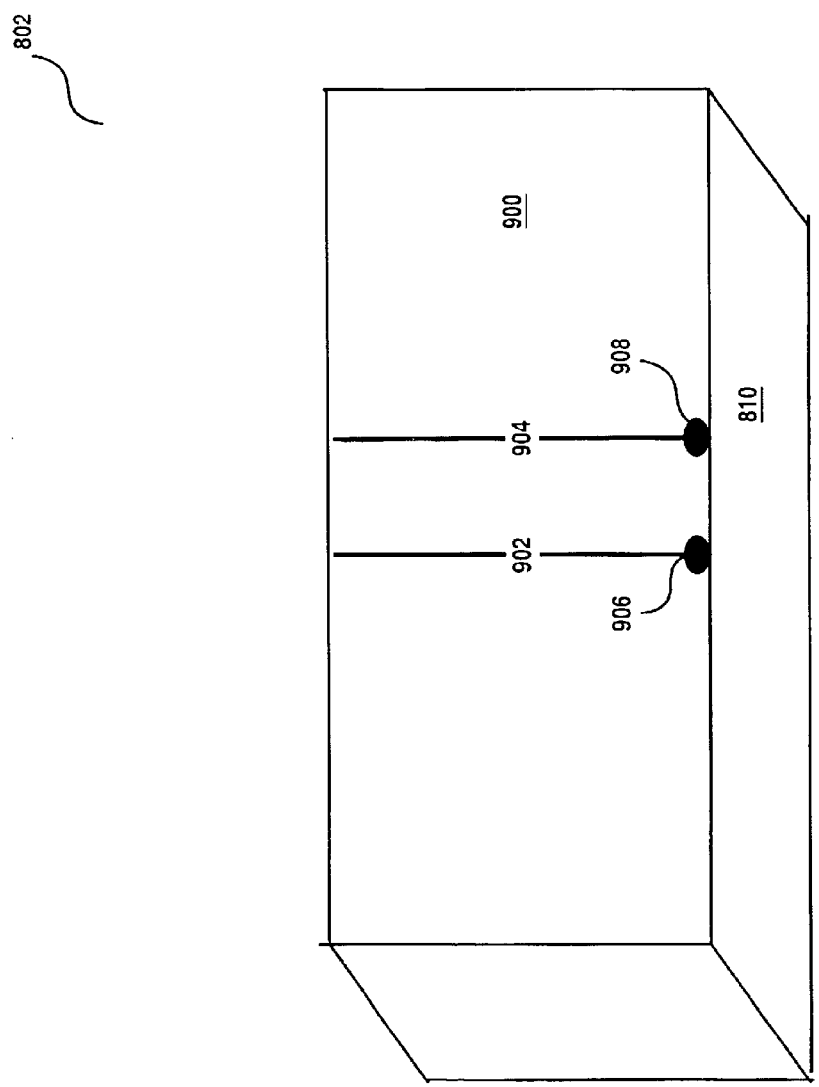
FIG. 9 illustrates the top surface of a processed metal cooling system, and the seams on the top surface.

The processed metal component 802 of the system is a derivative of the metal component 300 described above. As illustrated in FIG. 9, showing a top view of processed metal component 802, the processed metal component 802 comprises a top surface 900 that is formed flat by a swaging process that presses the two ridges 308, 310 of the metal component 300 onto a cooling tube 602 that has been placed in the groove 306 of the metal component 300. The top surface 900 comprises at least one seam 902, 904 (two shown). The ridges may form a lot of metal over the cooling tube such that the deformed metal forms over the entire top of the cooling tube, and only a single seam 902 or 904 is formed. Otherwise, as illustrated in FIG. 9, the cooling tube is left exposed, and two seams 902 and 904 are formed.

In embodiments where filler material is used, seams 902, 904 comprise filler material.

Below the at least one seam lies the groove 306, similar to that described above, that extends into the metal component from the top surface, and that holds the cooling tube 602 prior to the cooling tube 602 being swaged into place.

Top view 900 may expose deformation 906, 908 of ridges 308, 310 at end of metal component 300 where ridges 308, 310 end. Although not illustrated, side view 810 may show this as well.

Swaged Cooling Tube

Figure 10:
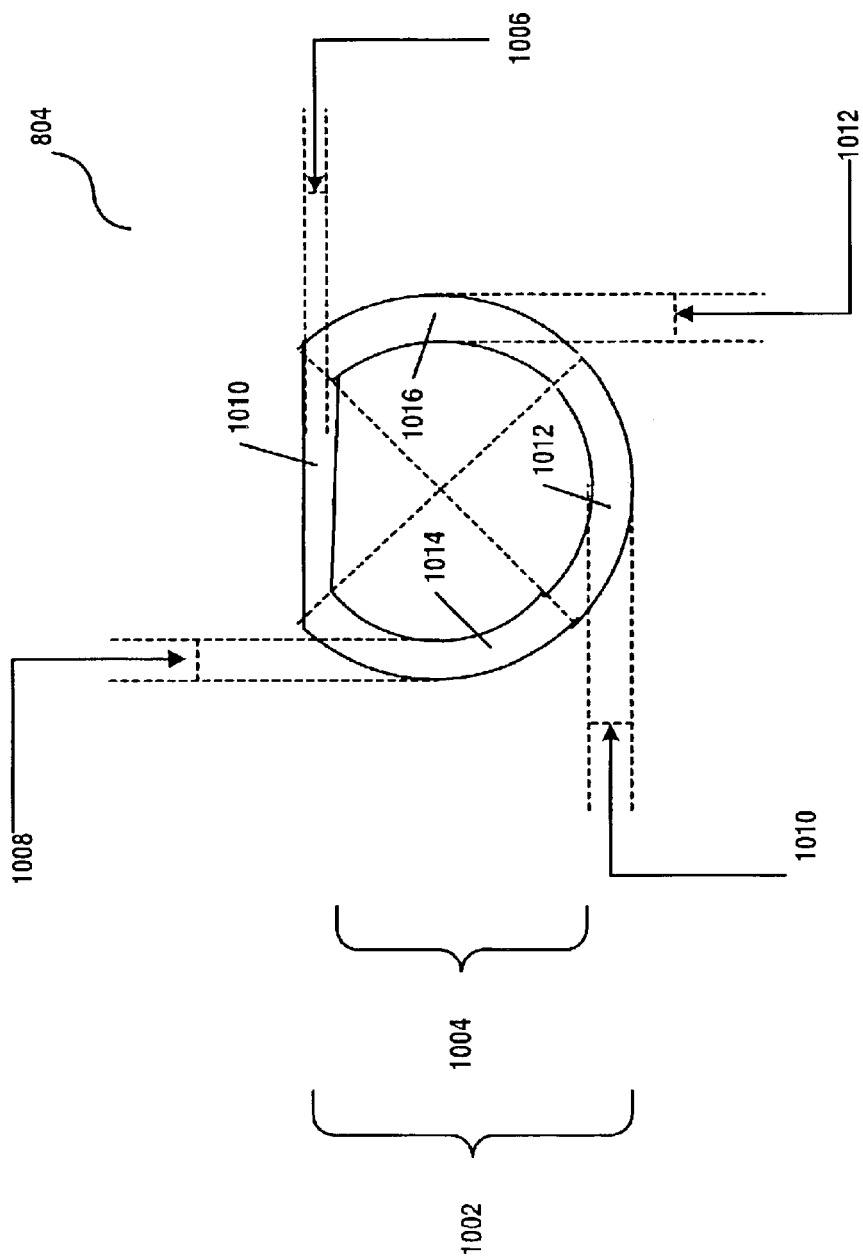
FIG. 10 illustrates a swaged cooling tube.

As illustrated in FIG. 10, a swaged cooling tube 804 is a cooling tube 602 that has been swaged into the groove 306 of the metal component 300. A swaged cooling tube 804 comprises an outer diameter 1002, an inner diameter 1004, and a wall comprising an upper wall portion 1010, a lower wall portion 1012, and two side wall portions 1014, 1016, where the thickness 1006, 1008, 1010, 1012 of each of the upper 1010, lower 1012, side portions 1014, 1016 are not all the same. In particular, the thickness 1006 of the upper wall 1010 (swaged cooling pipe 804) is smaller than the thickness 706 of the upper wall 710 (pre-swaged cooling pipe 602). In some cases, the thickness of the lower portion 1012 and side portions 1014, 1016 may be modified by the swaging process as well. However, these dimensions may also remain the same, depending on the amount of pressure that is put on the cooling tube, which is a function of the ridge height and the groove depth, as discussed above.

Additionally, cooling tube 804 has an outer diameter 1002 that is smaller than the outer diameter 702 of cooling tube 602, and an inner diameter 1004 that is smaller than the inner diameter 704 of cooling tube 602.

Deformed Metal

Figure 11:
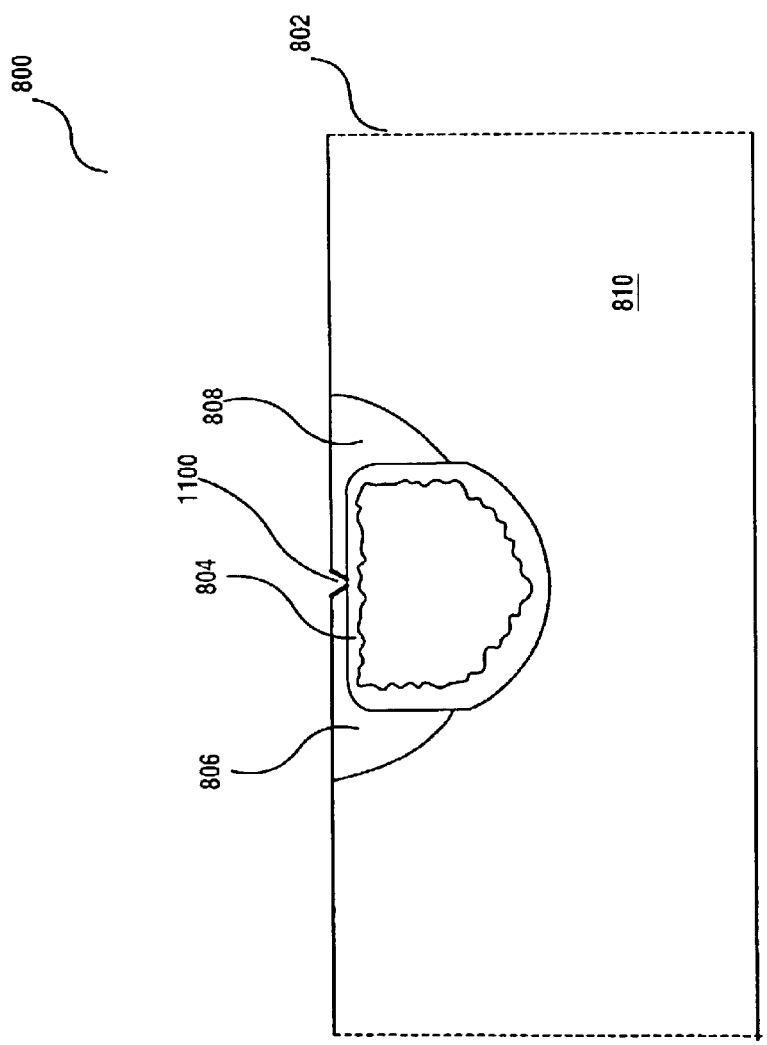
FIG. 11 is a side view of a metal cooling system illustrating the swaged cooling pipe and deformed metal surrounding the cooling pipe resulting in one seam.
Figure 12:
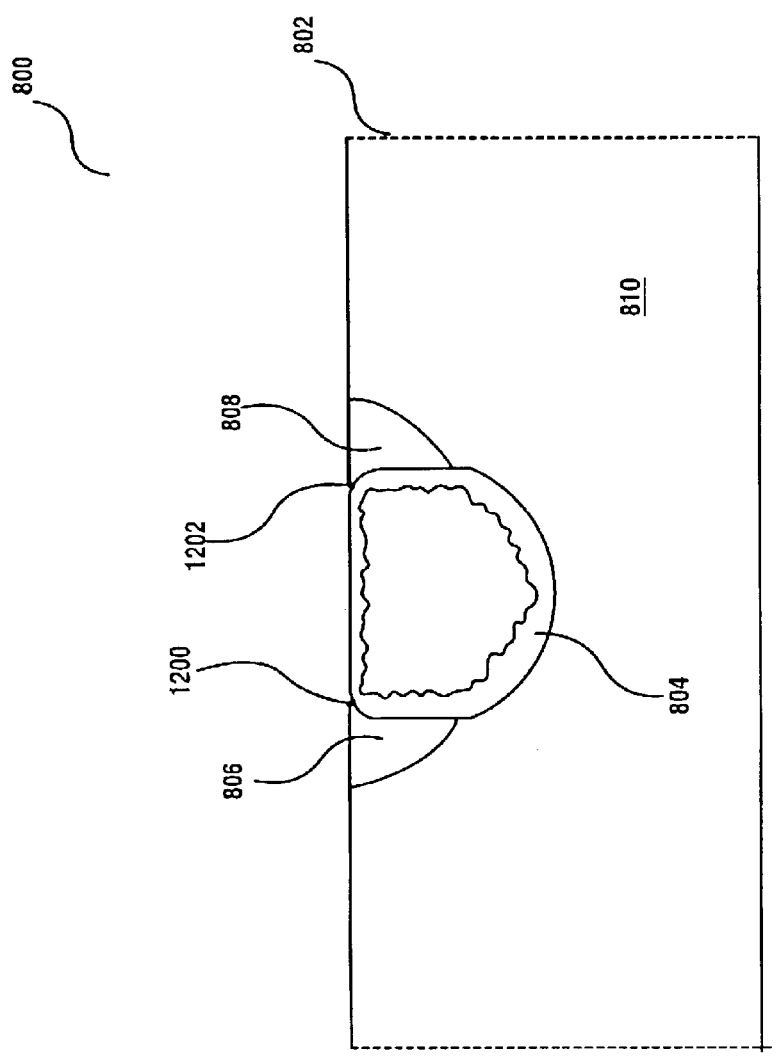
FIG. 12 is a side view of a metal cooling system illustrating the swaged cooling pipe and deformed metal around the cooling pipe resulting in two seams.

Referring back to FIG. 8, deformed metal 806, 808 is formed by pressing the ridges 308, 310 of metal component 300 onto the cooling tube 602. When the cooling tube 602 is swaged into place, the two ridges 308, 310 on the metal component 300 are pressed into and around the cooling tube 602, causing the two ridges 308, 310 to deform around the cooling tube 602. As illustrated in FIG. 11, the ridges may form a lot of metal over the cooling tube such that the deformed metal forms over the entire top of the cooling tube, and only a single seam 1100 is formed. Otherwise, as illustrated in FIG. 12, and two seams 1200, 1202 are formed.

Filler Material

Referring back to FIG. 6, the system may additionally comprise filler material 604 to improve the heat transfer between the metal component 300 and cooling tube 602. Filler material 604 may comprise epoxy, thermal adhesive, or grease joint, for example. The filler material 604 is applied to the inner surface 400 of the groove 306 so that when the cooling tube 602 is placed into the groove 306, the filler material 604 sits between the inner surface 400 of the groove 306 and the outer surface of the cooling tube 602. Once the cooling tube 602 has been swaged into place, the filler material 604 fills most, if not all, air gaps that may exist between the swaged cooling tube 804 and the inner surface 400 of the groove 306.

FIG. 13 shows various statistics related to the use of different groove depths and different filler material. The statistics show that a deeper groove produces less swaging and less contact pressure with the cooling tube, thereby resulting in lower heat transfer (higher thermal resistance). Similarly, a shallow groove produces more swaging and more contact pressure, thereby resulting in greater heat transfer (lower thermal resistance. See, for example, test results 1–3.

Furthermore, the statistics show that the use of a filler material significantly reduces the thermal resistance (i.e., increasing heat transfer), and that certain filler materials are more effective than others in this respect. In the tests performed and shown, it was found that the viscosity of the filler material had a greater impact on thermal resistance than the thermal conductivity of the filler material, which is possibly a result of a lower viscosity filler material having properties which make it flow more easily, thereby removing air gaps more efficiently. However, it should be noted that embodiments of the invention are not to be limited by the viscosity of the filler material. While the viscosity of the exemplary filler materials used are not noted, one of ordinary skill in the art would know, or be able to obtain knowledge of, the viscosity of these filler materials.

The statistics of FIG. 13 further show that there is a tradeoff between decreasing thermal resistance between the metal component and the cooling tube, and the pressure of the coolant flowing through the cooling tube. Specifically, it is shown that as the contact pressure increases (resulting in less thermal resistance), the coolant requires more pressure to maintain the same flowrate. Since there are instances when it is unfeasible to increase the pressure of the coolant, there is a motivation to select the combination of groove depth and filler material which achieve the least thermal resistance between the metal component and the cooling tube to achieve the most efficient balance between effective cooling and acceptable pressure drop.

Exemplary Embodiments

Below are example embodiments that utilize the invention as described above. However, it should be understood by one of ordinary skill in the art that the invention is not necessarily limited by these embodiments, and that, in fact, there may be other applications of the invention not mentioned herein.

Plasma Source Body

Embodiments of the invention may be used in a plasma source body, for example. Plasma chambers generate high heat loads on the internal surfaces, and must be liquid cooled. In this application, the source body is typically an aluminum alloy, and water is the liquid used to remove the heat. In order to avoid corrosion of the aluminum from different electrochemical potentials of downstream metals, copper cooling tubes are used. Copper is also an excellent thermal conductor that aids in the cooling of the source body.

Figure 14:
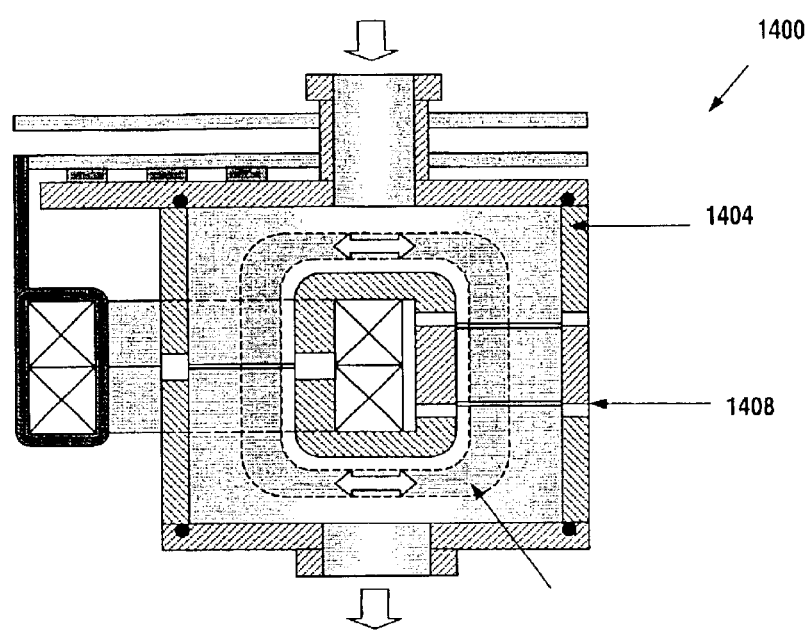
FIG. 14 illustrates an exemplary application of embodiments of the invention.

FIG. 14 illustrates a plasma chamber 1400 in accordance with general embodiments of the invention. The plasma chamber 1400 is formed from a metal such as aluminum, copper, nickel, or steel, or from a coated metal such as anodized aluminum or nickel-plated aluminum. The plasma chamber 1400 is coupled to a voltage source (not shown) to cause the initial ionization event that ignites the plasma. The plasma chamber 1400 within general embodiments of the invention is formed from a housing 1404, and comprises at least one dielectric break 1408 (only one referenced) in the housing 1404 to prevent induced current flow from forming in the plasma chamber 1400. The plasma chamber 1400 includes cooling tubes (not shown) for passing a coolant to control the temperature of the plasma chamber 1400. As one of ordinary skill in the art would appreciate, FIG. 14 is only illustrative of a plasma source that may be used with embodiments of the invention, and that other plasma sources having features and characteristics not shown or described may be used as well.

Oftentimes, the plasma chamber is a portable unit that is transported to different sites. When placed at a target site, i.e., a client, the cooling tube is attached to a water source. Since clients typically prefer to use their main water line, they also prefer to use the least amount of pressure possible to operate the plasma chamber. As a result, the plasma chamber must be operable at a minimum amount of pressure to accommodate such requests. This application is one of the instances where it is unfeasible to increase the pressure of the coolant, thereby motivating the selection of a thermal resistance/differential pressure drop combination that optimizes the tradeoff between high heat transfer and the pressure used to run coolant (i.e., water) through the cooling tube.

Coldplate Design

Embodiments of the invention may also be used in a coldplate design for cooling electronics with high power densities. This method may be useful to create low cost coldplates made of aluminum, or of other materials.

CONCLUSION

In the foregoing specification, embodiments of the invention have been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for installing a cooling tube into a metal component to cool the metal component, the method comprising:

inserting the cooling tube into a groove of the metal component having a first surface and a second surface, and having at least one ridge where each of the at least one ridge extends in a positive, vertical direction from one of the first and second surfaces;

the groove having an inner surface that extends from the . . . first and second surfaces into the metal component, and the cooling tube having an outer surface being adjacent to the inner surface of the groove; and swaging the cooling tube into the groove by applying pressure to the at least one ridge until the at least one ridge and cooling tube are flush with the first and second surfaces.

2. The method of claim 1, wherein:

the first surface begins at a first outer point, and ends at a second inner point, and the first ridge extends from the second inner point and a fifth inner point, the fifth inner point positioned between the first outer point and second inner point; and the second surface begins at a fourth outer point, and ends at a third inner point, and the second ridge extends from the third inner point and a sixth inner point, the sixth inner point positioned between the fourth outer point and third inner point.

3. The method of claim 1, wherein:

the first surface begins at a first outer point, and ends at a second inner point, and the first ridge extends from a point near the second inner point and a fifth inner point, the fifth inner point positioned between the first outer point and second inner point; and the second surface begins at a fourth outer point, and ends at a third inner point, and the second ridge extends from a point near the third inner point and a sixth inner point, the sixth inner point positioned between the fourth outer point and third inner point.

4. The method of claim 1, additionally comprising applying a filler material on the inner surface of the groove prior to inserting the cooling tube into the groove of the metal component, wherein swaging the cooling tube into the metal component results in the filler material filling air gaps between the outer surface of the cooling tube and the inner surface of the groove.

5. The method of claim 4, wherein the filler material comprises a thermally conductive adhesive.

6. The method of claim 5, wherein the thermally conductive adhesive comprises epoxy.

7. The method of claim 1, wherein a height of the first and second ridges is about 8.5% of the outer diameter of the cooling tube.

8. The method of claim 1, wherein the metal component comprises an aluminum component.

9. The method of claim 8, wherein the cooling tube comprises a copper tube.

10. The method of claim 1, wherein the cooling tube has an outer diameter that is approximately equal to the width of the groove at the surfaces.

11. A metal component into which a cooling tube is placed, comprising:

a first surface having a first outer point and a second inner point;

a second surface having a third inner point and a fourth outer point;

a groove located between the first and second surfaces, the groove having an inner surface that extends into the metal component, and that begins at the second inner point and ends at the third inner point;

a first ridge that extends in a positive, vertical direction from around the second inner point and from a fifth point located between the first outer point and the second inner point, the first ridge having a height measured from the first surface; and a second ridge that extends in a positive, vertical direction from around the third inner point and from a sixth point located between the fourth outer point and the third inner point, the second ridge having a height measured from the second surface.

12. The metal component of claim 11, wherein the first ridge extends in a positive, vertical direction from the second inner point and a fifth point, and the second ridge extends in a positive vertical direction from the third inner point and a sixth point.

13. The metal component of claim 11, additionally comprising a filler material that is applied on the wall of the groove.

14. The metal component of claim 13, wherein the filler material comprises a thermally conductive adhesive.

15. The metal component of claim 14, wherein the thermally conductive adhesive comprises epoxy.

16. The metal component of claim 11, wherein the height of the first and second ridges is about 8.5% of an outer diameter of the cooling tube.

17. The metal component of claim 11, wherein the metal component comprises an aluminum component.

18. The metal component of claim 17, wherein the cooling tube comprises a copper tube.

19. A metal cooling system, comprising:

a metal component having:

a top surface formed by swaging two ridges on the metal component onto a cooling tube, the cooling tube prior to swaging having a first wall thickness;

a groove that extends into the metal component from the top surface, and holding the cooling tube;

the cooling tube having an upper wall, a bottom wall, and two side walls, the cooling tube having been placed into the groove, the cooling tube having an upper wall thickness less than the first wall thickness; and deformed metal around each side of the groove, the deformed metal formed by the two ridges being swaged into the cooling tube.

20. The metal cooling system of claim 19, additionally comprising a filler material on the wall of the groove.

21. The metal cooling system of claim 20, wherein the filler material comprises a thermally conductive adhesive.

22. The metal cooling system of claim 21, wherein the thermally conductive adhesive comprises epoxy.

23. The metal cooling system of claim 19, wherein the metal component comprises an aluminum component.

24. The metal cooling system of claim 23, wherein the aluminum component comprises a plasma chamber.

25. The metal cooling system of claim 24, wherein the cooling tube comprises a copper tube.

26. A method for installing a cooling tube into a metal component to cool the metal component, the method comprising the steps of:

inserting the cooling tube into a groove of the metal component having a first surface and a second surface, and having at least one ridge where each of the at least one ridge extends in a positive, vertical direction from one of the first and second surfaces;

the groove having an inner surface that extends from the first and second surfaces into the metal component, and the cooling tube having an outer surface, and having an outer diameter being approximately equal to the width of the groove at the surfaces, and the outer surface of the cooling tube being adjacent to the inner surface of the groove; and swaging the cooling tube into the groove by applying pressure to the at least one ridge until the at least one ridge and cooling tube are flush with the first and second surfaces.

27. The method of claim 26, additionally comprising the step of applying a filler material on the inner surface of the groove prior to inserting the cooling tube into the groove of the metal component, wherein the step of swaging the cooling tube into the metal component results in the filler material filling air gaps between the outer surface of the cooling tube and the inner surface of the groove.

28. The method of claim 26, wherein a height of the first and second ridges is about 8.5% of the outer diameter of the cooling tube.

29. The method of claim 26, wherein the metal component comprises an aluminum component.

30. The method of claim 29, wherein the cooling tube comprises a copper tube.

* * * * *